United States Patent Office 2,986,560
Patented May 30, 1961

2,986,560

PROCESS FOR THE MANUFACTURE OF 11-OXY-GENATED STEROIDS AND INTERMEDIATES THEREFOR

Albert Wettstein and Julius Schmidlin, Basel, Switzerland, assignors to Ciba Pharmaceutical Products, Inc., Summit, N.J.

No Drawing. Filed Nov. 18, 1953, Ser. No. 392,982

Claims priority, application Switzerland Nov. 19, 1952

38 Claims. (Cl. 260—239.55)

This invention relates to a new process for the manufacture of compounds of the steroid series which are unsubstituted in 12-position and have an oxygen atom in 11-position. More particularly, the invention relates to a process for the manufacture of 11β-hydroxy- and 11-keto-steroids from 11-halogen-12-oxo-compounds by way of the 11:12β-oxides.

In general, the process comprises reacting a 11-halogen-12-oxo-steroid with a complex hydride of an amphoteric metal so as to produce the corresponding 11:12 halogen hydrin, dehydrohalogenating the latter to form the corresponding 11:12β-oxide, reacting the latter with a hydrohalic acid to form the corresponding 11β-hydroxy12-halogen steroid, oxidizing the 11β-hydroxy-12-halogen steroid so as to convert the 11-hydroxy group into a keto group, and replacing the halogen by hydrogen, the last two steps being carried out in optional sequence.

11:12β-oxides of the steroid series were hitherto only difficultly available. Starting from 12-hydroxy-steroids, these had first to be esterified and then the esterified hydroxyl group split off with formation of a double bond in 11:12-position. By adding on hypohalous acid to the unsaturated compounds thus produced, they were first converted into 11-hydroxy-12-halogen steroids and these then treated with dehydrohalogenating agents to obtain the 11:12β-oxides. This process gives poor yields. It therefore constitutes a considerable advance that one aspect of the present invention also provides a process that makes it possible to produce the 11:12β-oxides in a simple manner and in excellent yield. In this process there are used as starting materials 11-halogen-12-oxo-steroids, which are obtainable for example by halogenation of 12-oxo-steroids, especially 11α-halogen-12-oxo-, such as 11α-bromo-12-oxo-steroids. The process comprises reacting the 11-halogen-12-oxo-steroids with complex hydrides of amphoteric metals and dehydrohalogenating the 11:12-halogen hydrins thus obtained to form the 11:12β-oxides. In view of the facility with which the halogen, for example in 11α-bromo-12-ketones, is removed by various reducing agents, it is surprising that a smooth selective reduction to the halogen hydrins should be possible. It was further not to be expected that by this means, for example starting from 11α-halogen-12-ketones, practically exclusively the 12β-hydroxy-compounds would be obtained which are suitable for cyclization to the 11:12β-oxides.

The starting materials belong to the cyclopentanopolyhydrophenanthrene or polyhydrochrysene series. Especial importance is attached to the derivatives of spirostane, allospirostane, furostane, allofurostane, cholane, allocholane, pregnane, allopregnane, androstane and testane. The starting materials may also be substituted in the nucleus or in the side chain, for example in 3, 5, 6, 17, 20 and/or 21-position by free or functionally converted hydroxyl or oxo groups, such as acyloxy groups, for example acetoxy, propionyloxy or benzoyloxy groups, by alkoxy groups, for example methoxy or ethoxy groups, by halogen atoms, by acetalized oxo groups and further by free or functionally converted carboxyl groups, such as nitrile groups or esterified carboxyl groups or by a lactone group, for example butenolide group. The starting materials can have any configurations and may also contain double bonds, as for example in 4:5-, 5:6- or 20:22-position.

For the reduction of the oxo group there are suitable primarily complex hydrides of boron, such as sodium, lithium borohydride, or alkali-alkoxy borohydrides, for example, sodium trimethoxy borohydride. As agents for splitting off hydrohalic acid there are preferably used hydroxides or oxides of metals of the first and second group of the periodic system, for example silver oxide and further tertiary bases such as pyridine or collidine. In this case it is often of advantage in order to obtain high yields of 11:12β-oxides, to use tertiary bases in combination with one of the specified mono- or divalent metal hydroxides or oxides.

The 11-halogen-12β-hydroxy-steroids, and also in some cases the 11:12β-oxido-steroids produced therefrom, for example 11:12β-oxido-spirostanes, and the 11β-hydroxy-12α-halogen-spirostanes which compounds are obtainable according to the present process, are new, and are also embraced within the scope of the present invention.

To produce the 12-unsubstituted compounds of the steroid series, which comprise another aspect of the invention, the 11:12β-oxido-steroids are converted into 11β-hydroxy-12-halogen compounds with the aid of hydrohalic acids, the 12-halogen atom is removed and, if desired, the hydroxy group in 11-position is oxidized to the keto group, the last two steps being carried out in optional sequence. For the cleavage of the 11:12β-epoxides hydrohalic acids, for example, hydrogen chloride, hydrogen bromide, or hydrogen iodide, are employed. The said hydrohalic acids are used for this purpose in aqueous or anhydrous diluents, for example in aqueous dioxane. The halogen atom in 12-position can be eliminated by means of nascent or catalytically activated hydrogen. It is of advantage to use Raney nickel charged with hydrogen or zinc in the presence of a weak acid or an alcohol, for example, glacial acetic acid or 2-ethoxyethanol. It is possible to apply especially mild conditions to remove the iodine from the 12-iodo derivatives.

The products are intended for use as intermediate products for the production of midicaments especially for the manufacture of cortisone, Kendall's Compound F (Δ⁴-3:20-diketo-11β:17α:21 - trihydroxy - pregnene) and related hormones. Thus the 11-oxygenated 5-allo- and 5-normal spirostane compounds obtained according to the process of the invention on treatment with acetic anhydride at elevated temperature are converted into the corresponding pseudo derivatives which by careful oxidation with chromic acid can be transformed into 20-keto-compounds of the pregnane series. The reactions by which the 11-oxygenated compounds of the pregnane series are converted into the above mentioned hormones are well known and consist in hydroxylations at positions 17 and 21 and introduction of a double bond at position 4:5 by a halogenation-dehydrohalogenation procedure. 11-oxygenated compounds of the pregnane series are also obtained from correspondingly substituted cholanic acid esters by converting the ester group by reaction with phenylmagnesiumbromide into a diphenylcarbinol group, splitting off water therefrom, allylic bromination followed by dehydrohalogenation to produce a Δ²⁰ᐟ²³-24:24-diphenyl-choladiene which is oxidized to a 20-keto-pregnane compound. The above mentioned hormones may also be prepared by elaboration of the dihydroxy-acetone-side chain starting from a 17-ketone of the androstane and testane series. For this purpose it is of especial advantage to use the well known method which consists in tht reaction of the 17-ketone with acetylene followed by partial hydrogenation of the acetylene grouping. By allylic rearrangement of the 17-hydroxy-compound obtained a $\Delta^{17:20}$-21-hydroxy-pregnane is formed which by treatment with hydrogen peroxide in the presence of osmium tetroxide is converted in to a 17α:21-dihydroxy-20-keto-pregnane.

The following examples illustrate the invention, the relation between parts by weight and parts by volume being the same as that between the gram and the cubic centimeter:

*Example 1*

To a solution, cooled to 0° C., of 1.261 parts by weight of 11α:23ξ-dibromo-hecogenin acetate in 10 parts by volume of anhydrous tetrahydrofurane, there are added dropwise with stirring within 1½ hours 5 parts by volume of a 2-molar solution of lithium borohydride in tetrahydrofurane. After the reaction mixture has been further stirred for 10½ hours at 0° C., the excess of hydride is destroyed by careful addition of 10 parts by volume of 10 percent acetic acid and the tetrahydrofurane then removed by evaporation under vacuum. The precipitated reaction product is taken up in an ether-benzene mixture (2:1), and the extract washed with 2-normal sulphuric acid, 2 percent sodium bicarbonate solution and water, dried and evaporated in vacuum. From the colourless residue there are obtained by crystallization from methanol 1.020 parts by weight (80.6% of the calculated quantity) of 3β-acetoxy-11α:23ξ-dibromo-12β-hydroxy-5α:22a-spirostane partially hydrolyzed in the 3-position, as a microcrystalline powder of melting point 190–203° C.

A solution of 1.020 parts by weight of the above described 3β - acetoxy - 11α:23ξ - dibromo - 12β - hydroxy-5α:22a-spirostane in 19.4 parts by volume of anhydrous pyridine is shaken for 22 hours in the dark with 1.5 parts by weight of freshly precipitated and dried silver oxide. Filtration from the silver oxide is then carried out with rinsing of the filter with benzene and ether, and the filtrate is evaporated under vacuum. The residue is dissolved, for re-acetylation, in 7.5 parts by volume of anhydrous pyridine, mixed with 3.75 parts by volume of acetic anhydride and allowed to stand for 16 hours at room temperature. The mixture is then stirred into cold 2-normal sulphuric acid, the crude product taken up in ether-benzene mixture (2:1) and the extracts washed with 2-normal sulphuric acid, water, 5 percent sodium bicarbonate solution and water, dried and evaporated. The residue crystallizes from ether. There is obtained as first fraction 0.570 part by weight (64.0% of the theoretical quantity) of 3β - acetoxy - 11β:12β - oxido - 23ξ - bromo-5α:22a-spirostane of melting point 224 to 228° C. (with decomposition). From the mother liquor, by concentration and addition of petroleum ether, an almost equally pure second fraction of 0.070 part by weight (7.9% of the calculated quantity) is obtained of melting point 223–228° C. (with decomposition). On recrystallizing again from ether the quite pure epoxide is obtained which melts at 231.5 to 233.5° C. (with decomposition), $[\alpha]_D^{24}=-32°\pm2°$ (c.=0.925 in chloroform).

In an analogous manner there is obtained from 1.051 parts by weight of 3α-acetoxy-11α-bromo-12-oxo-cholanic acid methyl ester, by careful reaction with ten mole equivalent lithium borohydride in anhydrous tetrahydrofurane, crude 3α-acetoxy-11α-bromo-12β-hydroxy-cholanic acid methyl ester, which without further purification is treated consecutively with 4.64 parts by weight of freshly precipitated silver oxide and with acetic anhydride in anhydrous pyridine. From the residue, subjected to preliminary purification by chromatography on 31.5 parts by weight of alumina, there is obtained by recrystallization from ether-petrol ether, in good yield, the 3α-acetoxy-11β:12β-oxido-cholanic acid methyl ester of melting point 150–152° C.

*Example 2*

0.2108 part by weight of pure 3β-acetoxy-11β:12β-oxido-23ξ-bromo-5α:22a-spirostane is dissolved in 19.1 parts by volume of pure dioxane, the solution is mixed with 4.77 parts by volume of aqueous 2.5 N-hydrochloric acid and allowed to stand at room temperature for 1 hour. To the solution there are then added while shaking in the course of 10 minutes 14.3 parts by volume of water. 15 minutes later, the crystals which have separated are removed by suction-filtering, washed with aqueous dioxane of 40% strength and water, and then dried over phosphorus pentoxide and potassium hydroxide in vacuo. By recrystallization once from ether with the use of methylene chloride as additional solvent there can be obtained 0.1972 part by weight (88.0% of the theoretical quantity) of pure 3β-acetoxy-11β-hydroxy-12α-chloro-23ξ-bromo-5α:22a-spirostane in the form of fine colourless prisms of melting point 240–242° C. (with decomposition), $[\alpha]_D^{23}=-31°\pm2°$ (c.=1.000 in chloroform).

A solution of 0.1313 part by weight of 3β-acetoxy-11β-hydroxy-12α-chloro-23ξ-bromo - 5α:22a - spirostane in 11.2 parts by volume of ethylene chloride and 11.2 parts by volume of glacial acetic acid is mixed at 20° C. with 1.79 parts by volume of a solution of chromic acid in 99.5% acetic acid containing per part by volume 0.0024 part by weight of active oxygen. After a reaction period of 45½ hours the excess chromic acid is destroyed by the addition of 0.45 part by volume of aqueous 0.1-molar methanol, and after another hour and a half 11.2 parts by volume of water are added and the reaction mixture then concentrated under reduced pressure at a bath temperature of 40° C. to about 1 part by volume. The crude product is taken up in a 2:1 mixture of ether and benzene and washed in turn with 0.5 N-sulphuric acid, water, 2% sodium bicarbonate solution and water, the solution is dried with sodium sulfate and evaporated under reduced pressure. The residue is recrystallized from ether with the use of methylene chloride as additional solvent. The first fraction weighs 0.1007 part by weight (77.1% of the theoretical quantity) and melts at 231–236° C. (with decomposition), it consists of pure 3β-acetoxy-11-keto-12α-chloro-23ξ-bromo-5α:22a-spirostane. From the mother liquor there can be obtained by concentrating and adding petroleum ether another 0.0061 part by weight (4.6% of the calculated quantity) of melting point 221–231° C. (with decomposition).

After recrystallization from ether the pure compound melts at 233–236° C. (with decomposition), $$[\alpha]_D^{23}=-70°\pm2°$$

(c.=0.987 in chloroform).

To a boiling solution of 0.058 part by weight of 3β-acetoxy-11-keto-12α-chloro-23ξ - bromo - 5α:22a - spirostane in 5.8 parts by volume of glacial acetic acid there are added in the course of 4 hours while stirring vigorously 1.62 parts by weight of zinc dust in small portions. The boiling temperature is maintained while stirring for another two hours, and the zinc is removed by filtration after cooling and diluting the reaction mixture with benzene. The filter residue is thoroughly washed with hot benzene and the entire filtrate completely evaporated in vacuo at a bath temperature of 40° C. The substance which remains behind is dissolved in ether, the solution washed consecutively with 0.5 N-hydrochloric acid, water, 2% sodium bicarbonate solution and water, dried with sodium sulphate and evaporated. From a little methanol 0.039 part by weight (83.3% of the theoretical quantity) of pure 3β-acetoxy-11-keto-5α:22a-spirostane crystallizes in the form of flat octahedrons of melting point 216–221° C.

*Example 3*

0.0552 part by weight of 3β-acetoxy-11β:12β-oxido-23ξ-bromo-5α:22a-spirostane is dissolved in 5.0 parts by volume of pure dioxane and mixed with 1.25 parts by volume of aqueous 2.5 N-hydrobromic acid. After about 5 minutes crystals begin to separate from the solution which has meanwhile become straw-coloured. The crystal-suspension is kept in the dark for 2 hours and frequently shaken during this time, and 3.75 parts by volume of water then added in the course of 20 minutes. After another 30 minutes the crystals are separated by suction-filtering and washed with aqueous dioxane of 40 percent strength and water. The substance is dried over phosphorus pentoxide and potassium hydroxide and dissolved in methylene chloride, then filtered for clarification and crystallized by evaporation with the addition of ether. There is obtained, in addition to 0.0051 part by weight of largely crystalline mother liquor residue, 0.0525 part by weight (82.9% of the calculated quantity) of pure 3$\beta$-acetoxy-11$\beta$-hydroxy-12$\alpha$:23$\xi$-dibromo-5$\alpha$:22a - spirostane of melting point 237–239° C. (with decomposition), $[\alpha]_D^{23}=-23°\pm2°$ (c.=1.000 in chloroform).

*Example 4*

A solution of 0.0473 part by weight of 3$\beta$-acetoxy-11$\beta$:12$\beta$-oxido-5$\alpha$:22a-spirostane in 3.5 parts by volume of dioxane which is free from peroxide is mixed with 0.50 part by volume of aqueous 4 N-hydrobromic acid and allowed to stand at room temperature for 1 hour. In the course of 30 minutes there are then added 4.75 parts by volume of water, whereupon the reaction product precipitates in the form of crystals. After another 30 minutes the whole is suction-filtered, the colourless crude product is washed with 7.5 parts by volume of aqueous dioxane of 40% strength and 12.5 parts by volume of water, and dried over phosphorus pentoxide and potassium hydroxide under reduced pressure. By recrystallization from ether and a mixture of ether and petroleum ether there is obtained 0.0399 part by weight (72.0% of the theoretical quantity) of 3$\beta$-acetoxy-11$\beta$-hydroxy-12$\alpha$-bromo-5$\alpha$:22a-spirostane of melting point 224–226° C. The pure substance obtained from another recrystallization operation melts at 224.5 to 226° C., $[a]_D^{23}=27°\pm4°$ (c.=1.080 in chloroform).

The compound used as starting material in this and the following example can be obtained as follows:

8.20 parts by weight of zinc duct are added in five portions in the course of four hours while stirring continuously to a boiling solution of 0.276 part by weight of the 3$\beta$-acetoxy-11$\beta$:12$\beta$-oxido-23$\xi$-bromo - 5$\alpha$:22$\alpha$ - spirostane described in Example 1 in 27.6 parts by volume of 2-ethoxyethanol. The whole is then maintained at the boil while stirring for another 4 hours. The reaction mixture is cooled and filtered, the filter residue carefully washed with hot benzene, and the filtrate evaporated in vacuo at a bath temperature of 40° C. The complete removal of the 2-ethoxyethanol is best achieved by repeatedly taking up the residue in benzene. The crude product so obtained is dissolved in 4.12 parts by volume of anhydrous pyridine, mixed with 2.62 parts by volume of acetic anhydride, and allowed to stand for 16 hours at room temperature. The solution is then evaporated under a pressure of about 1 mm. of mercury, and the residual crystalline substance is dissolved in a mixture of ether and benzene (3:1), the solution is shaken, first with water for a long time, then in quick succession with 0.1 N-acetic acid, water, 2% sodium bicarbonate solution and water, and the solvent is distilled off under reduced pressure after drying with sodium sulphate. 0.1954 part by weight (82.6% of the theory) of 3$\beta$-acetoxy-11$\beta$:12$\beta$-oxido-5$\alpha$:22a-spirostane crystallizes from methanol in the form of lustrous lamellae. The melting point is at 186.5–194.5° C. and after purification by filtration through alumina is raised to 205–207° C.

*Example 5*

0.0473 part by weight of 3$\beta$-acetoxy-11$\beta$:12$\beta$-oxido-5$\alpha$:22a-spirostane is dissolved in 3.47 parts by volume of dioxane which is free from peroxide. 0.53 part by volume of aqueous 7.57 N-hydriodic acid is added and the red-brown solution allowed to stand in the dark for 5 hours. 4.7 parts by volume of water are then added in the course of 20 minutes, whereby the oily reaction product precipitates. After being allowed to stand for several hours the mother liquor is decanted and the resin which is mixed with crystals and adheres to the walls of the vessel is first washed with 0.5 part by volume of aqueous dioxane of 40 percent strength and 5 parts by volume of water. It is then dissolved in ether free of peroxide, the solution washed with water, dried with sodium sulphate and evaporated under reduced pressure. The residue crystallizes almost completely and is repeatedly recrystallized from ether. The 3$\beta$-acetoxy-11$\beta$-hydroxy-12$\alpha$-iodo-5$\alpha$:22a-spirostane is thus obtained in the form of handsome colourless prisms of melting point 182 to 187° C. (with decomposition).

The product is dissolved in 3.0 parts by volume of dioxane which is free from peroxide and treated while stirring at room temperature for 6 hours with 0.5 part by weight of Raney nickel. The nickel is filtered off and washed with benzene and the colourless filtrate evaporated under reduced pressure. The residue is re-acetylated by allowing it to stand for 10 hours at room temperature with 1.25 parts by volume of pyridine and 0.75 part by volume of acetic anhydride. It is then evaporated under reduced pressure and taken up in ether. The solution is washed in succession with 0.1 N-acetic acid, water, 2% sodium bicarbonate solution, dried with sodium sulphate and evaporated. By recrystallization from ether and mixtures of ether and petroleum ether, 0.0184 part by weight (38.7% of the theory) of 3$\beta$-acetoxy-11$\beta$-hydroxy-5$\alpha$:22a-spirostane of melting point 215.5–220° C. can be obtained. After another recrystallization from ether the melting point is at 220–223° C.

*Example 6*

2.050 parts by weight of 3$\beta$-acetoxy-12-keto-11$\alpha$:23$\xi$-dibromo-5$\alpha$:22a - spirostane (11$\alpha$:23$\xi$-dibromo-hecogenin acetate) are reduced with lithium borohydride as in Example 1 and the reaction mixture worked up in the manner there described. The resulting crude hydrogenation product (2.026 parts by weight) is chromatographed by the wash-through elution method over 60.9 parts by weight of magnesium silicate with the use of mixtures of hexane and benzene, pure benzene, and mixtures of benzene and ether. The hexane-benzene elutriates found to be uniform by paper-chromatography yield on recrystallization from a mixture of ether and petroleum ether a total of 1.255 parts by weight (61.0% of the theoretical quantity) of pure 3$\beta$-acetoxy-11$\alpha$:23$\xi$-dibromo-12$\beta$-hydroxy-5$\alpha$:22a-spirostane in the form of small colourless needles of melting point 205–206.5° C. (with decomposition), $[\alpha]_D^{26}=-60°\pm2°$ (c.=0.872 in chloroform).

A solution of 1.132 parts by weight of 3$\beta$-acetoxy-11$\alpha$:23$\xi$-dibromo-12$\beta$-hydroxy-5$\alpha$:22a-spirostane of melting point 205–206.5° C. (with decomposition) in 21.5 parts by volume of anhydrous pyridine is shaken in the dark together with 4.143 parts by weight of freshly precipitated and dried silver oxide. After 48 hours, another 2.072 parts by weight of silver oxide are added and shaking is continued for 72 hours longer to complete the reaction. The silver oxide or silver bromide is then removed by suction-filtering and the filter rinsed with benzene and ether. The filtrate is evaporated under reduced pressure. In order to remove inorganic impurities, the residue is dissolved in 30 parts by volume of a 1:1 mixture of ether and benzene, treated with 0.5 part by weight of "Norit" (adsorbent carbon) and the adsorbing agent is filtered off. When the quite clear solution is evaporated a colourless crude product is obtained. On recrystallization from ether with the use of methylene chloride as additional solvent it yields a total of 0.891 part by weight (90.2% of the calculated quantity) of the quite pure 3$\beta$- acetoxy-11β:12β-oxido-23ξ-bromo-5α:22a - spirostane of melting point 231.5–233.5° C. (with decomposition).

*Example 7*

0.2578 part by weight of 3β-acetoxy-11β:12β-oxido-23ξ-bromo-5α:22a-spirostane and 1 part by volume of zinc dust are covered with 37.5 parts by volume of absolute alcohol. (The zinc dust has previously been activated by treatment for a short time with ice-cold 2 N-sulphuric acid, thoroughly washed with boiled water, and the water expelled with absolute alcohol.) The mixture is refluxed with vigorous stirring, after 2 hours another part by volume of activated zinc dust is added and the mixture maintained at the boil for another 2 hours while stirring continuously. The reaction mixture is filtered while warm and the filter residue cautiously washed with hot benzene and the filtrate evaporated under reduced pressure. The residue is dissolved in ether, washed with water and worked up in the usual manner. The crude product, which is now quite free of halogen, is recrystallized from methanol and then chromatographed over magnesium silicate (celite) by the wash-through elution method. As elutriating agent hexane, benzene or ether is used or binary mixtures of such solvents. These fractions which by paper chromatographic test are found to be uniform yield 0.1885 part by weight (79.7% of the theoretical quantity) of pure 3β-acetoxy-11β:12β-oxido-5α:22a-spirostane of melting point 205–207° C., $[\alpha]_D^{27}$= —33°±3° (c.=1.036 in chloroform).

0.0945 part by weight of 3β-acetoxy-11β:12β-oxido-5α:22a-spirostane is dissolved in 3.47 parts by volume of peroxide-free dioxane. While daylight is excluded, 0.53 part by volume of iodine-free 7.57 N-hydriodic acid is added and 15 minutes later the pale-yellow solution is admixed cautiously, while being continuously shaken, with 4.81 parts by volume of boiled water of room temperature. The iodohydrin, which has precipitated in crystalline form, is suction-filtered and the filter rinsed with 2.5 parts by volume of aqueous 40% dioxane and 12.5 parts by volume of boiled water. It is then dried under reduced pressure over phosphorous pentoxide and potassium hydroxide. By recrystallization there can be separated in the form of colourless prisms 0.0947 part by weight of 3β-acetoxy-11β-hydroxy-12α-iodo-5α:22a-spirostane of melting point 182–187° C. (with decomposition) and 0.0047 part by weight slightly less pure material of melting point 165–172° C. (with decomposition) (i.e. a total of 82.8% of the calculated quantity). $[\alpha]_D^{25}$= —15°±2° (c.=1.007 in chloroform).

1 part by volume of Raney nickel charged with hydrogen and moist with dioxane is added to a solution of 0.0601 part by weight of 3β-acetoxy-11β-hydroxy-12α-iodo-5α:22α-spirostane in 2.0 parts by volume of dioxane which is free from peroxide, and 2.5 parts by volume of peroxide-free ether, and the mixture is stirred in the dark for 23 hours at 3–5° C. The solution is filtered to remove the nickel, the filter being rinsed with ethanol and ether, then evaporated under reduced pressure at room temperature and the completely crystallized residue is re-acetylated by dissolving it in 0.80 part by volume of pyridine and allowing to stand with 0.48 part by volume of acetic anhydride for 16 hours at 10° C. The reaction mixture is evaporated at 20° C. in a vacuum produced by any oil pump, and after working up by the usual extraction method yields on recrystallization from mixtures of ether and petroleum ether 0.387 part by weight of 3β-acetoxy-11β-hydroxy - 5α:22α - spirostane of melting point 222–224° C. and 0.0055 part by weight of melting point 216–220.5° C. (a total of 93.0% of the theoretical quantity), $[\alpha]_D^{27}$= —55°±4° (c.=0.985 in chloroform).

*Example 8*

0.995 part by weight of 3α:20-diacetoxy-11α-bromo-12-keto-pregnane is dissolved in 12.5 parts by volume of anhydrous tetrahydrofurane and in the course of 30 minutes while stirring at 0° C., 7.5 parts by volume of a 2-molar solution of lithium borohydride in tetrahydrofurane added dropwise to the solution. After a reaction period of 4 hours the mixture is poured into 30 parts by volume of ice-cooled 0.5 N-acetic acid and when the evolution of hydrogen has subsided the tetrahydrofurane is distilled off under reduced pressure as completely as possible. The reaction product is allowed to stand for 48 hours, then finely crushed, placed on a suction-filter, thoroughly washed with water, and dried in vacuo over calcium chloride. The resulting 3α:20-diacetoxy-11α-bromo-12β-oxy-pregnane (0.980 parts by weight=98% of the calculated yield) is worked up directly.

0.980 part by weight of this crude 3α:20-diacetoxy-11α-bromo-12β-oxy-pregnane is dissolved in 75 parts by volume of methanol and mixed with 25 parts by volume of a 2-molar solution of potassium hydroxide in methanol in an atmosphere of nitrogen. The reaction mixture is allowed to stand at room temperature for 72 hours and then neutralized by cautiously adding 25 parts by volume of 2 N-hydrochloric acid while stirring. After the addition of 10 parts by volume of water, the precipitated crude product is filtered off with suction, carefully washed with water and dried in vacuo over phosphorus pentoxide. There is thus obtained 0.632 part by weight (96% of the calculated quantity) of crude 3α:20-dioxy-11:12β-oxido-pregnane which is practically free from halogen.

0.632 part of this crude product is dissolved in 125 parts by volume of toluene and 20 parts by volume of cyclohexanone. 25 parts by volume of solvent are distilled off and 0.817 part by weight of aluminum isopropylate is added and the whole boiled for 2 hours with exclusion of moisture. 50 parts by volume of a molar Rochelle salt solution are then added, and the volatile portions distilled off with steam. After cooling, the reaction product is taken up in a 3:1-mixture of ether and benzene, washed with a molar Rochelle salt solution and water, dried with sodium sulphate, and the solution evaporated. The residue is chromatographed on 25 parts by weight of alumina by the fractional elution method. From the fractions obtained with mixtures of hexane and benzene (3:1), (1:1) and (1:3) there is obtained by crystallization from a mixture of ether and petroleum ether a total of 0.287 part by weight (46% of the calculated yield) of 3:20-diketo-11:12β-oxido-pregnane of melting point 149–152° C., $[\alpha]_D^{22}$=+102°±4° (c.=1.109 in chloroform).

The starting material used in this example is obtained, for example, from 3α:12α-diacetoxy-20-keto-pregnane by reduction with sodium borohydride, conversion of the resulting triol into the 3α:20-diacetate, oxidation with chromic acid to form 3α:20-diacetoxy-12-keto-pregnane and bromination of the latter in 11-position by the conventional method.

*Example 9*

A solution of 0.661 part by weight of 3:20-diketo-11:12β-oxido-pregnane in 35 parts by volume of peroxide-free dioxane is mixed with 5 parts by volume of 4 N-hydrobromic acid and allowed to stand at room temperature for 2 hours. 20 parts by volume of water are then cautiously added, whereupon the reaction product precipitates in crystalline form. After being left to stand for 30 minutes it is suction-filtered, thoroughly washed with water and dried in vacuo over phosphorus pentoxide and potassium hydroxide. By recrystallization from a mixture of methylene chloride and acetone a total of 0.685 part by weight (83% of the calculated quantity) of 3:20-diketo-11β-oxy-12α-bromo-pregnane is obtained in the form of colourless lamellae of melting point 240–243° C. (decomposition).

0.411 part of 3:20 - diketo - 11β - oxy - 12α - bromo--pregnane is dissolved in 50 parts by volume of ethylene chloride and 50 parts by volume of glacial acetic acid and mixed at room temperature with 7.70 parts by volume of a solution of chromium trioxide in acetic acid of 99.5 percent strength containing, per part by volume, 0.0024 part by weight of active oxygen. After a reaction period of 48 hours the excess oxidation agent is destroyed by the addition of 2.0 parts by volume of aqueous 0.1-molar methanol, and the reaction mixture then evaporated in vacuo to about 5 parts by volume while adding in portions 50 parts by volume of water. Another 10 parts by volume of water are then added and the mixture extracted by agitation with ether. The ethereal solution is washed with 0.5 N-sulphuric acid, water, 2% sodium bicarbonate solution and water and dried with sodium sulphate, then evaporated and the residue recrystallized from mixtures of acetone and ether. 0.345 part by weight (84% of the theoretical quantity) of 3:11:20 - triketo - 12α - bromo-pregnane is obtained in the form of lustrous platelets of melting point 187–190° C.

Into a solution, heated to 80° C., of 0.205 part by weight of 3:11:20 - triketo - 12α - bromo - pregnane in 8.0 parts by volume of glacial acetic acid is introduced in portions while stirring vigorously in the course of 10 minutes 0.410 part by weight of zinc dust and the mixture then stirred for another 10 minutes at this temperature. After cooling, the mixture is diluted with 8.0 parts by volume of benzene, suction-filtered, the undissolved zinc is thoroughly washed with benzen, and the filtrate evaporated in vacuo. The residue is dissolved in ether, and the solution washed with 0.5 N-hydrochloric acid, water, 2% sodium bicarbonate solution and water, dried with sodium sulphate, and evaporated. From the residue there is obtained by recrystallization from ether with the use of methylene chloride a total of 0.150 part by weight (91% of the calculated quantity) of 3:11:20-triketo-pregnane in the form of flat octahedrons of melting point 158–160° C., $[\alpha]_D^{23} = +112° \pm 4°$ (c.=0.984 in chloroform).

*Example 10*

0.165 part by weight of 3:20 - diketo - 11:12β - oxido-pregnane is dissolved in 8.73 parts by volume of peroxide-free dioxane and to the solution are added with the exclusion of daylight 1.27 parts by volume of 7.5 N-hydriodic acid free of iodine. After 30 minutes, the pale yellow solution is cautiously diluted with 20 parts by volume of boiled water at room temperature and the dioxane is distilled off as completely as possible in vacuo at 20–25° C. The crude product is taken up in peroxide-free methlyene chloride, the solution is rapidly washed with ice-cold 0.01 N-thiosulphate and water, dried with sodium sulphate, and evaporated in vacuo at 20–25° C. The residue is the 3:20-diketo-11β-oxy-12α-iodo-pregnane. It is advantageously dehalogenated at once. To this end the iodohydrin is covered with 5.5 parts by volume of peroxide-free dioxane and 6.25 parts by volume of peroxide-free ether, the solution is cooled to 0° C. and 2 parts by volume of Raney nickel charged with hydrogen and moist with dioxane are added. The mixture is vigorously stirred in the dark for 12 hours at 0–3° C., the nickel separated by filtration, the residue washed with ethanol and benzene and the filtrate evaporated under reduced pressure. For purification the crude product is chromatographed over 8.25 parts by weight of aluminum oxide by the fractional elution method. The crude fractions eluted with benzene and mixtures of benzene and ether (9:1) and (1:1) melting at 164 to 170° C., yield on recrystallization from a small amount of methanol a total of 0.117 part by weight (70% calculated on the oxido compound used) of pure 3:20-diketo-11β-oxy-pregnane of melting point 170–172° C., $[\alpha]_D^{24} = +128° \pm 4°$ (c=0.883 in chloroform).

What is claimed is:

1. A process which comprises treating a 11α-bromo-12-oxo-steroid selected from the group consisting of those of the pregnane, allopregnane, spirostane, allospirostane, cholane, allocholane, androstane and testane series with a complex hydride of boron so as to produce the corresponding 11:12 halogen hydrin.

2. A process in accordance with claim 1 wherein the complex hydride of boron is selected from the group consisting of sodium borohydride and lithium borohydride.

3. A process which comprises treating an 11α-bromo-12-oxo-steroid selected from the group consisting of those of the pregnane, allopregnane, spirostane, allospirostane, cholane, allocoholane, androstane and testane series with a member of the group consisting of sodium borohydride, lithium borohydride and alkali-alkoxy-borohydrides so as to produce the corresponding 11α - bromo - 12β-hydroxy steroid.

4. A process in accordance with claim 3, wherein the 11α-bromo-12-oxo-steroid is a 11α-bromo-12-oxo-spirostane.

5. A process in accordance with claim 4 where the spirostane is 11α:23-dibromo-hecogenin acetate.

6. A process in accordance with claim 3, wherein the 11α-bromo-12-oxo-steroid is a member of the group consisting of 11α-bromo-12-oxo-cholanic acid and its lower alkyl esters.

7. A process in accordance with claim 6, wherein the cholanic acid ester is 3α-acetoxy-11α-bromo-12-oxo-cholanic acid methyl ester.

8. A process in accordance with claim 3, wherein the 11α-bromo-12-oxo-steroid is a 11-bromo-12-oxo-pregnane.

9. A process in accordance with claim 8, wherein the pregnane is 3α:20-diacetoxy-11α-bromo-12-oxo-pregnane.

10. 3β-acetoxy-11α:23-dibromo-12β-hydroxy - 5α:22a-spirostane.

11. 3α-acetoxy-11α-bromo-12β-hydroxy-cholanic acid methyl ester.

12. 3α:20-diacetoxy-11α-bromo-12β-hydroxy-pregnane.

13. 3β-acetoxy-11β-hydroxy - 12α - chloro - 23 - bromo-5α:22a-spirostane of the following formula:

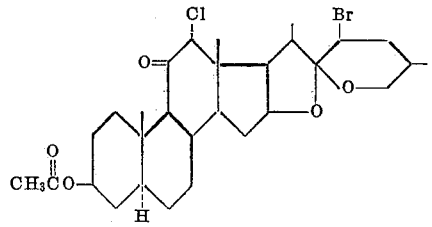

14. 3β-acetoxy-11-keto-12α-chloro-23 - bromo - 5α:22a-spirostane of the following formula:

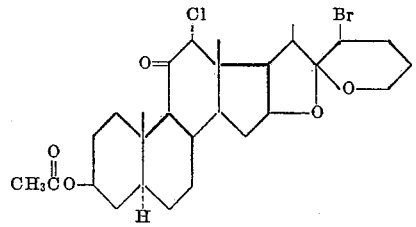

15. 11:12β-epoxy-tigogenin-acetate having the following formula:

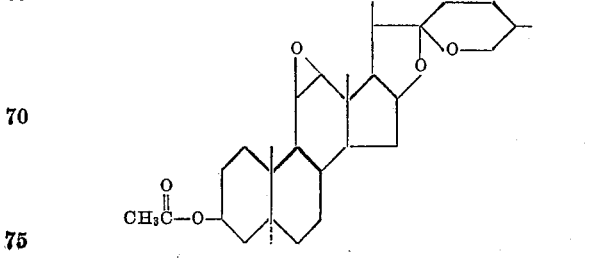

16. 3β-acetoxy-11:12β-oxido-23-bromo-5α:22a-spirostane.

17. 3α:20-dihydroxy-11:12β-oxido-pregnane.

18. 3β-acetoxy-11β-hydroxy-12α-23-dibromo-5α:22a-spirostane.

19. 3β-acetoxy-11β-hydroxy-12α-bromo-5α:22a-spirostane.

20. 3β-acetoxy-11β-hydroxy-12α-iodo-5α:22a-spirostane.

21. 3:20-dioxo-11β-hydroxy-12α-iodo-pregnane.

22. A member of the group consisting of 3-OR-11-oxo-12α-halogen-spirostane of the formula:

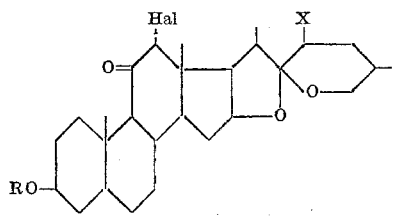

in which R stands for a member of the group consisting of hydrogen and lower alkanoyl and X for a member of the group consisting of hydrogen, chlorine and bromine.

23. A compound of claim 22 wherein R is acetoxy and X is hydrogen.

24. A compound of claim 22 wherein R is acetoxy and X is bromine.

25. An ester of an 11α-bromo-12β-hydroxy cholanic acid with a lower alkanol.

26. A process which comprises treating an 11α-bromo-12-oxo-steroid selected from the group consisting of those of the pregnane, allopregnane, spirostane, allospirostane, cholane, allocholane, androstane and testane series with a member of the group consisting of sodium borohydride, lithium borohydride and alkali-alkoxy borohydrides so as to produce the corresponding 11α-bromo-12β-hydroxy steroid, splitting off hydrogen halide from the latter with a basic agent to form the corresponding 11:12β-oxide and reacting the latter with a hydrohalic acid to form the corresponding 11β-hydroxy-12α-halogen steroid.

27. A process which comprises treating an 11α-bromo-12-oxo-steroid selected from the group consisting of those of the pregnane, allopregnane, spirostane, allospirostane, cholane, allocholane, androstane and testane series with a member of the group consisting of sodium borohydride, lithium borohydride and alkali-alkoxy borohydrides so as to produce the corresponding 11α-bromo-12β-hydroxy-steroid, splitting off hydrogen halide from the latter with a basic agent to form the corresponding 11:12β-oxide, reacting the latter with a hydrohalic acid to form the corresponding 11β-hydroxy-12α-halogen steroid, and reducing the compound with a member of the group consisting of nascent and catalytically activated hydrogen in order to eliminate the halogen.

28. A process which comprises treating an 11α-bromo-12-oxo-steroid selected from the group consisting of those of the pregnane, allopregnane, spirostane, allospirostane, cholane, allocholane, androstane and testane series with a member of the group consisting of sodium borohydride, lithium borohydride and alkali-alkoxy borohydrides so as to produce the corresponding 11α-bromo-12β-hydroxy steroid, splitting off hydrogen halide from the latter with a basic agent to form the corresponding 11:12β-oxide, reacting the latter with hydriodic acid to form the 11β-hydroxy-12α-iodo steroid and reducing the latter with Raney nickel.

29. A process which comprises treating an 11α-bromo-12-oxo-steroid selected from the group consisting of those of the pregnane, allopregnane, spirostane, allospirostane, cholane, allocholane, androstane and testane series with a member of the group consisting of sodium borohydride, lithium borohydride and alkali-alkoxy borohydrides so as to produce the corresponding 11α-bromo-12β-hydroxy steroid, splitting off hydrogen halide from the latter with a basic agent to form the corresponding 11:12β-oxide, reacting the latter with a hydrohalic acid to form the corresponding 11β-hydroxy-12α-halogen steroid, treating said 11β-hydroxy-12α-halogen steroid with chromium trioxide, so as to convert the 11β-hydroxy group into a keto group, and reducing the 11-oxo-12α-halogen steroid with a member of the group consisting of nascent and catalytically activated hydrogen in order to eliminate the halogen.

30. A process which comprises reducing an 11β-hydroxy-12α-iodo-steroid selected from the group consisting of those of the pregnane, allopregnane, spirostane, allospirostane, cholane, allocholane, androstane and testane series with Raney nickel to replace the iodine atom by hydrogen.

31. A member of the group consisting of 11α-bromo-12β-hydroxy-pregnane of the formula:

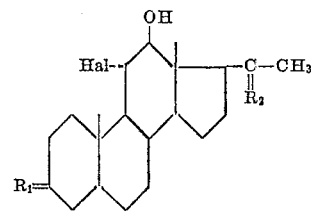

in which $R_1$ and $R_2$ stands for a member selected from the group consisting of a hydroxy group together with a hydrogen atom, a lower alkanoyloxy group together with a hydrogen atom and an oxo group and Hal represents bromo.

32. A member of the group consisting of 11α-bromo-12β-hydroxy-cholanic acid ester of the formula:

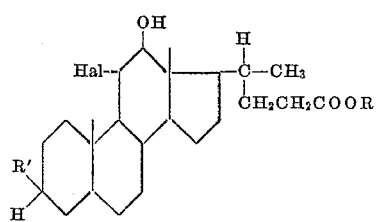

wherein R stands for lower alkyl and $R_1$ stands for a lower alkanoyloxy group and Hal represents bromo.

33. A member of the group consisting of 3-OR-11β-hydroxy-12α-chloro-23X-spirostane of the formula:

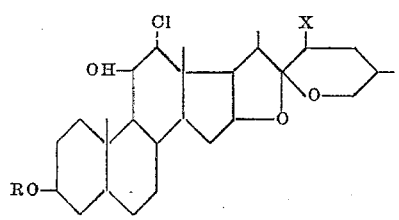

in which R stands for a member of the group consisting of hydrogen and lower alkanoyl and X for a member of the group consisting of hydrogen and bromine.

34. A member of the group consisting of 3-OR-11α-bromo-12β-hydroxy-spirostane of the formula:

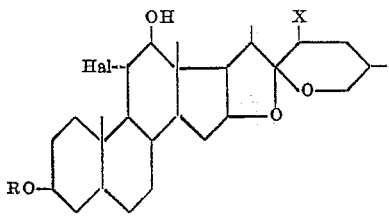

in which R stands for a member of the group consisting of hydrogen and lower alkanoyl and X for a member of the group consisting of hydrogen and bromine and Hal represents bromo.

35. A member of the group consisting of 3-OR-11:12β-oxido-spirostane of the formula:

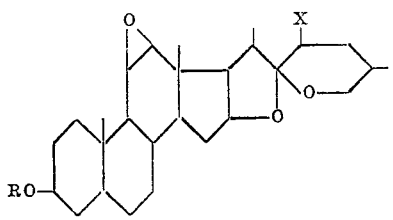

in which R stands for a member of the group consisting of hydrogen and lower alkanoyl and X for a member of the group consisting of hydrogen and bromine.

36. A member of the group consisting of 3-OR-11β-hydroxy 12α-halogen spirostane of the formula:

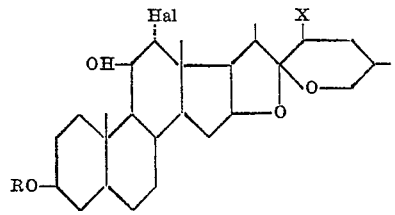

in which R stands for a member of the group consisting of hydrogen and lower alkanoyl and X for a member of the group consisting of hydrogen and bromine.

37. A member of the group consisting of 3-OR-11β-hydroxy-12α-iodo-pregnane of the formula:

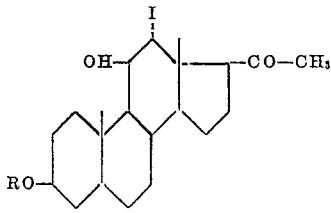

in which R stands for a member of the group consisting of hydrogen and lower alkanoyl.

38. A process which comprises splitting off hydrogen halide from an 11α-bromo-12β-hydroxy steroid selected from the group consisting of those of the pregnane, allopregnane, spirostane, allospirostane, cholane, allocholane, androstane and testane series by treatment with a basic agent so as to form the corresponding 11:12β-oxide.

References Cited in the file of this patent

UNITED STATES PATENTS

| | | |
|---|---|---|
| 2,403,683 | Reichstein et al. | July 9, 1946 |
| 2,447,325 | Gallagher | Aug. 17, 1948 |
| 2,503,842 | Reichstein | Apr. 11, 1950 |
| 2,599,481 | Plattner | June 3, 1952 |
| 2,773,077 | Conbere | Dec. 4, 1956 |
| 2,776,302 | Ruzicka et al. | Jan. 1, 1957 |

OTHER REFERENCES

Gallagher: J. Biochemistry, vol. 162, 1946, pages 504–505.

Cornforth: Chemistry and Industry, August 1953, pages 919 and 920.

Chamberlain: J. American Chem. Soc., vol. 73, page 2396, May 1951.

Schmidlin et al.: Helv. Chim. Acta, vol. 36, part 6, October 15, 1953, pages 1241–1251.

UNITED STATES PATENT OFFICE
CERTIFICATION OF CORRECTION

Patent No. 2,986,560                          May 30, 1961

Albert Wettstein et al.

It is hereby certified that error appears in the above numbered patent requiring correction and that the said Letters Patent should read as corrected below.

Column 5, line 40, for "$[\alpha]_D^{23} = 27°$" read -- $[\alpha]_D^{23} = -27°$ --; line 44, for "duct" read -- dust --; column 5, line 47 and column 7, lines 52 and 66, for "22α", each occurrence, read -- 22a --; column 7, line 65, for "0.387" read -- 0.0387 --; column 9, line 42, for "7.5 N" read -- 7.57 N --; column 10, line 9, for "allocoholane" read -- allocholane --; lines 40 to 49, the formula should appear as shown below instead of as in the patent:

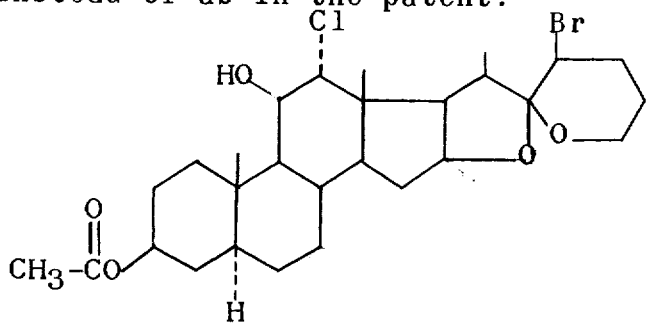

same column, lines 52 to 56, the right-hand portion of the formula should appear as shown below instead of as in the patent:

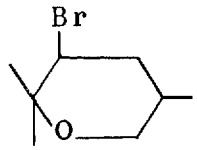

Signed and sealed this 16th day of January 1962.

(SEAL)
Attest:

ERNEST W. SWIDER                                       DAVID L. LADD
Attesting Officer                                           Commissioner of Patents